United States Patent
Benaissi et al.

(10) Patent No.: US 12,514,798 B2
(45) Date of Patent: Jan. 6, 2026

(54) USE OF [6]-PARADOL FOR STABILIZATION OF COSMETIC COMPOSITIONS

(71) Applicant: SYMRISE AG, Holzminden (DE)

(72) Inventors: Karima Benaissi, Saint Ouen (FR); Léa Schmidt, Paris (FR); Martina Herrmann, Hameln (DE); Marielle Le Maire, Boulogne Billancourt (FR)

(73) Assignee: SYMRISE AG, Holzminden (DE)

( * ) Notice: Subject to any disclaimer, the term of this patent is extended or adjusted under 35 U.S.C. 154(b) by 909 days.

(21) Appl. No.: 16/968,223

(22) PCT Filed: Feb. 7, 2018

(86) PCT No.: PCT/EP2018/053038
§ 371 (c)(1),
(2) Date: Aug. 7, 2020

(87) PCT Pub. No.: WO2019/154486
PCT Pub. Date: Aug. 15, 2019

(65) Prior Publication Data
US 2021/0030645 A1 Feb. 4, 2021

(51) Int. Cl.
*A61K 8/00* (2006.01)
*A61K 8/35* (2006.01)
*A61Q 13/00* (2006.01)
*A61Q 19/10* (2006.01)
*C11B 9/00* (2006.01)

(52) U.S. Cl.
CPC ............... *A61K 8/35* (2013.01); *A61Q 13/00* (2013.01); *A61Q 19/10* (2013.01); *C11B 9/0061* (2013.01); *A61K 2800/30* (2013.01); *A61K 2800/522* (2013.01); *A61K 2800/524* (2013.01)

(58) Field of Classification Search
CPC ....................................................... A61K 8/35
See application file for complete search history.

(56) References Cited

U.S. PATENT DOCUMENTS

2012/0258058 A1* 10/2012 Herrmann ............... A61P 17/00
424/59

FOREIGN PATENT DOCUMENTS

WO       2019154486 A1    8/2019

OTHER PUBLICATIONS

PCT/EP2018/053038; PCT Search Report and Written Opinion; Apr. 4, 2018; 15 pages.
Sitaram, Dixit, "Inhibiting Rancidity in Soaps & Cosmetics", Chemical Business, 1999, 6 pages.

* cited by examiner

*Primary Examiner* — Necholus Ogden, Jr.
(74) *Attorney, Agent, or Firm* — Timothy H. Van Dyke; Wolter Van Dyke Davis, PLLC

(57) ABSTRACT

Suggested is the use of [6]-paradol for stabilizing cosmetic compositions, wherein the cosmetic compositions are selected from the group consisting of cleansing compositions and fragrance compositions.

9 Claims, 7 Drawing Sheets

USE OF [6]-PARADOL FOR STABILIZATION OF COSMETIC COMPOSITIONS

CROSS-REFERENCE TO RELATED APPLICATION

This application is a national stage entry of and claims priority to PCT/EP2018/053038, titled USE OF [6]-PARADOL FOR STABILIZATION OF COSMETIC COMPOSITIONS, filed Feb. 7, 2018, which is hereby incorporated by reference in its entirety.

FIELD OF INVENTION

The present invention relates to a method for stabilizing cosmetic compositions, the use of [6]-paradol for stabilizing cosmetic compositions, in particular a soap and an eau de toilette comprising [6]-paradol.

STATE OF THE ART

[6]-paradol is a known substance [IUPAC-Name: 1-(4-hydroxy-3-methoxyphenyl)-decan-3-one, CAS number: 27113-22-0, FEMA 4665]. It can be synthesized e.g. by catalytic hydrogenation of the corresponding unsaturated analog according to the procedure reported by H. D. Locksley et al. (J. Chem. Soc., Perkin Trans. I 1972, 442, 3001-3006) or purified from natural sources. [6]-paradol is light yellow to colorless solid or liquid depending on the temperature (melting point 31-32° C., Dictionary of Natural Products) with low odor especially at the low use levels required in compositions according to the invention.

The antioxidative and antitumor promoting effects of [6]-paradol and its homologs were reported (Mutation Research 2001, 400279, 1-8,). [6]-paradol attenuated the $H_2O_2$- and UV-induced formation of oxidized DNA bases in vitro. The antioxidant efficacy of [6]-paradol was also deduced from the observation that oral administration of 30 mg/kg b.w. (6)-paradol to DMBA-treated hamsters on alternate days from DMBA painting for 14 weeks, significantly improved the status of antioxidants (Pharmacological reports, 2010, 62, 1178-1185).

A composition of [6]-paradol and unsaturated fatty acids is known from WO/2017/097362. However, the main focus here is on the stabilization of foods including vegetable oils or cosmetic compositions that contain resorcinol, such as some creams. Stabilization of cosmetic compositions like cleansing and fragrance compositions is not described.

Cosmetic compositions, as cleansing and fragrance compositions, are extremely sensitive to oxidation from light and heat. For example in cleansing compositions, the oxidation induces rancidity, discoloration and odor deviations. Normally fragrances and colorants are used in soaps to cover the thus obtained unpleasant and typical smell and/or color of oxidized soap compositions.

However, those frequently used additives like colorants and fragrances also suffer from instability issues which result in strong color and odor deviations over time especially when exposed to oxidants like air, UV, light and heat.

For this reason, antioxidants are often used in cleansing formulations to protect fatty acids, fragrances and colorants from oxidation. Based on the same principle, the fragrance compositions are also very susceptible to oxidation and show strong deviations in color and smell. The most widely used antioxidant on the market for colorant and odor protection in cleansing and fragrance compositions is butylated hydroxytoluene, also known as dibutylhydroxytoluene (BHT).

BHT is a lipophilic organic compound, chemically a derivative of phenol. Industrially, BHT is prepared by the reaction of p-cresol (4-methylphenol) with isobutylene (2-methylpropene) catalyzed by sulfuric acid. Alternatively, BHT is prepared from 2,6-di-tert-butylphenol by hydroxymethylation or aminomethylation followed by hydrogenolysis.

However, BHT is also known for its toxicity. Currently there is discussion between the link of BHT to cancer risk and asthma. Furthermore, there is an in vitro indication for endocrine disruption. Furthermore BHT is suspected of triggering allergy-like symptoms. Especially in the use of BHT in cosmetics allergic skin reactions have been reported. Therefore, there is a need for new cosmetic compositions, especially for cleansing and fragrance compositions that are free of BHT.

The object of the present inventions was therefore to provide alternatives for BHT in cosmetic compositions that overcome the disadvantages of the prior art. Specifically, it was the object of the present invention to provide efficient and cost effective alternatives to BHT which are able to protect cleansing and fragrance compositions from color and/or odor deviations.

DESCRIPTION OF THE INVENTION

This object is solved by the subject matter of the present invention which is the use of [6]-paradol for stabilizing cosmetic compositions, wherein the cosmetic compositions are selected from the group consisting of cleansing compositions and fragrance compositions.

Surprisingly it has been found that [6]-paradol stabilizes cleansing and fragrance compositions. A stabilization in the meaning of the present invention is to be understood as a stabilization which is at least partially of cosmetic compositions. In other words, the use of [6]-paradol protects cosmetic compositions, which are cleansing and fragrance compositions, for example of oxygen, temperature and/or light and therefore the use of [6]-paradol protects cosmetic composition ingredients from odor change and/or discoloration.

Another advantage of the present invention is that [6]-paradol can be used as stabilization ingredient or antioxidant without adding further stabilization ingredients or antioxidants, like BHT, to the cosmetic compositions. So 6-paradol can be used alone or in combination with conventional stabilizers or antioxidants like EDTA or BHT.

In a preferred embodiment according to the invention the use of [6]-paradol stabilizes odor/and or color of the cosmetic compositions. In another preferred embodiment according to the invention [6]-paradol protects cosmetic compositions from discoloration and/or odor deviations. Cosmetic composition in the sense of the present invention is to be understood as cleansing composition and/or fragrance composition.

Cleansing compostions according to the present inventions are for examples soaps, detergents, cleansing lotions and the like for skin cleaning; shampoos, conditioners and the like for hair cleaning and protecting; toothpastes, tooth creams, and the like for oral hygiene; creams, emulsions, sunscreen preparations, sunburn preventive preparations, lubricating and massaging preparations, insect repellent preparations and the like to protect the skin from harmful effects of either chemicals, dust and soil, ultraviolet rays, insects, and other harmful agents present in the environment. Antiperspirant, foot deodorants, mouthwashes, and the like to improve or eliminate odors or personal wetness by eliminating bacterial actions, and/or retention of medicament on a surface are also within this category of basic cosmetic. In a preferred embodiment according to the invention the cleansing composition is soap.

Fragrance compositions according to the present invention include for example aroma compounds and flavouring compounds which are well known in the art. These flavouring agents can be chosen from synthetic flavouring liquid and/or oils derived from plants leaves, flowers, fruits and so forth, and combinations thereof. Representative flavouring liquids include: artificial, natural or synthetic fruit flavours such as *Eucalyptus*, lemon, orange, banana, grape, lime, apricot and grapefruit oils and fruit essences including apple, strawberry, cherry, orange, pineapple and so forth; bean and nut derived flavours such as coffee, cocoa, cola, peanut, almond and so forth; and root derived flavours such as licorice or ginger.

The flavouring compound is preferably selected from the group consisting of essential oils and extracts, tinctures and balsams, such as, for example, anisole, basil oil, bergamot oil, bitter almond oil, camphor oil, citronella oil, lemon oil; *Eucalyptus citriodora* oil, *Eucalyptus* oil, fennel oil, grapefruit oil, camomile oil, spearmint oil, caraway oil, lime oil, mandarin oil, nutmeg oil (in particular nutmeg blossom oil=maces oil, mace oil), myrrh oil, clove oil, clove blossom oil, orange oil, oregano oil, parsley (seed) oil, peppermint oil, rosemary oil, sage oil (clary sage, Dalmatian or Spanish sage oil), star aniseed oil, thyme oil, vanilla extract, juniper oil (in particular juniper berry oil), wintergreen oil, cinnamon leaf oil; cinnamon bark oil, and fractions thereof, or constituents isolated therefrom.

It is of particular advantage if the fragrance composition according to the invention comprises at least one flavouring compound, preferably two, three, four, five, six, seven, eight or more flavouring compounds chosen from the following group: menthol (preferably I-menthol and/or racemic menthol), anethole, anisole, anisaldehyde, anisyl alcohol, (racemic) neomenthol, eucalyptol (1,8-cineol), menthone (preferably L-menthone), isomenthone (preferably D-isomenthone), isopulegol, menthyl acetate (preferably L-menthyl acetate), menthyl propionate, carvone (preferably (−)-carvone, optionally as a constituent of a spearmint oil), methyl salicylate (optionally as a constituent of a wintergreen oil), eugenol acetate, isoeugenol methyl ether, beta-homocyclocitral, eugenol, isobutyraldehyde, 3-octanol, dimethyl sulfide, hexanol, hexanal, trans-2-hexenal, cis-3-hexenol, 4-terpineol, piperitone, linalool, 8-ocimenyl acetate, isoamyl alcohol, isovaleraldehyde, alpha-pinene, beta-pinene, limonene (preferably D-limonene, optionally as a constituent of an essential oil), piperitone, trans-sabinene hydrate, menthofuran, caryophyllene, germacrene D, cinnamaldehyde, mint lactone, thymol, gamma-octalactone, gamma-nonalactone, gamma-decalactone, (1,3E,5Z)-undecatriene, 2-butanone, ethyl formate, 3-octyl acetate, isoamyl isovalerate, cis- and trans-carvyl acetate, p-cymol, damascenone, damascone, cis-rose oxide, trans-rose oxide, fenchol, acetaldehyde diethyl acetal, 1-ethoxyethyl acetate, cis-4-heptenal, cis-jasmone, methyl dihydrojasmonate, 2'-hydroxypropiophenone, menthyl methyl ether, myrtenyl acetate, 2-phenylethyl alcohol, 2-phenylethyl isobutyrate, 2-phenylethyl isovalerate, geraniol, nerol and viridiflorol.

In particular preferred aroma or flavouring compounds encompass menthol, cineol, eugenol, thymol, cinnamic aldehyde, peppermint oil, spearmint oil, *Eucalyptus* oil, thyme oil, cinnamon oil, clove oil, spruce needle oil, fennel oil, sage oil, aniseed oil, star anise oil, chamomile oil, and caraway oil, and their mixtures.

In one embodiment according to the invention the fragrance compositions can be included in a cleansing composition, preferably in soap. If the fragrance composition is included in a cleansing composition, preferably in soap blends are usually made from a large number of different compounds in order to arrive at a balanced perfume and/or eau de toilette, which is not all at once being released from the cleansing composition, preferably soap upon use or during storage, but is released in a rather controlled manner upon use of the cleansing composition, preferably soap.

In another embodiment according to the invention the fragrance composition can be included in other compositions, such as for example in hygiene products or illuminants. In a preferred embodiment according to the invention the fragrance composition is added to air fresheners. In another preferred embodiment according to the invention the fragrance composition is added to candles.

In one embodiment according to the invention the fragrance composition is perfume or eau de toilette. In a preferred embodiment according to the invention the fragrance composition is eau de toilette.

As used herein, the singular form "a," "an," and "the" include plural references unless the context clearly dictates otherwise. For example, the term "a compound" or "at least one compound" may include a plurality of compounds, including mixtures thereof. Thus, for example, reference to "cosmetic composition," "the cosmetic composition," or "a cosmetic composition" also includes a plurality of cosmetic compositions.

In a further embodiment according to the invention [6]-paradol stabilizes odor of cosmetic compositions. In a further embodiment according to the invention [6]-paradol stabilizes color of cosmetic compositions. In a further embodiment according to the invention [6]-paradol stabilizes odor and color of the cosmetic compositions. In a preferred embodiment according to the invention [6]-paradol stabilizes odor of cleansing compositions. In a preferred embodiment according to the invention [6]-paradol stabilizes color of cleansing compositions. In a preferred embodiment according to the invention [6]-paradol stabilizes odor and color of cleansing compositions. In a preferred embodiment according to the invention [6]-paradol stabilizes odor of fragrance compositions. In a preferred embodiment according to the invention [6]-paradol stabilizes color of fragrance compositions. In a preferred embodiment according to the invention [6]-paradol stabilizes odor and color of fragrance compositions.

In another embodiment according to the invention the used amount of [6]-paradol is 0.00001 to 1 wt. %, preferably in the range from 0.001 to 0.1 wt. %, and particularly preferably in the range from 0.005 to 0.05 wt. % relative to the total weight of the composition. The most preferred amount of [6]-paradol is 0.01 to 0.02 wt. % relative to the total weight of the composition. Another most preferred amount of [6]-paradol is 0.05 wt. % relative to the total weight of the composition. Another most preferred amount of [6]-paradol is 0.005 wt. % relative to the total weight of the composition.

In a preferred embodiment according to the invention the cosmetic composition is free of BHT. In other words, in a preferred embodiment according to the invention [6]-paradol is used alone for stabilization of cosmetic compositions. The term "alone" means in this context the use of [6]-paradol without BHT.

In one embodiment according to the invention [6]-paradol is added as a mixture with a solvent to the cosmetic composition. Any solvent which is suitable for [6]-paradol can be used herein, for example oils such as vegetable oil triglycerides e.g. caprylic/capric triglyceride or vegetable oils (processed e.g. refined, hydrogenated or non-processed) such as e.g. soybean (*Glycine soja*) oil, sunflower (*Helianthus annuus*) seed oil, castor (*Ricinus communis*) seed oil, wheat (*Triticum vulgare*) germ oil, corn (*Zea mays*) oil, sweet almond (*Prunus Amygdalus Dulcis*) seed oil, sesame (*Sesamum indicum*) seed oil, olive (*Olea europaea*) oil, mineral oil (paraffinum liquidum), organic solvents (of synthetic or natural origin) such as e.g. dipropylene glycol, isopropyl myristate, isopropyl palmitate, ethyl myristate, methyl myristate, dioctyl adipate, triethyl citrate, triacetin, diethyl tartrate, ethyl lactate, butyl lactate, isoparaffinic hydrocarbons available e.g. as Isopar series like Isopar M, Isopar L, isopar H, isopar G, alcohols such as e.g. ethanol, isopropyl alcohol, benzyl alcohol, phenoxyethyl alcohol, propylene glycol, butylene glycol, 1,3-propandiol, hexylene glycol, 1,2-pentanediol, 1,2-hexanediol, 1,2-octanediol or mixtures of two or more of the mentioned solvents.

In a preferred embodiment according to the invention Caprylic/Capric Triglyceride (CCTG) is used as a solvent. In a further preferred embodiment according to the invention soybean (*Glycine soja*) oil, sunflower (*Helianthus annuus*) seed oil or mineral oil is used as a solvent. In a further preferred embodiment a water and/or miscible solvent is used as a solvent, for example ethanol, isopropyl alcohol, triethyl citrate, propylene glycol, butylene glycol, 1,3-propandiol, 1,2-pentanediol, 1,2-hexanediol. In a further preferred embodiment according to the invention dipropylene glycol (DPG) is used as a solvent. In a further preferred embodiment according to the invention isopropyl myristate (IPM) or isopropyl palmitate (IPP) is used as a solvent. In a further preferred embodiment according to the invention dioctyl adipate (DOA) is used as a solvent. In a further preferred embodiment according to the invention isoparaffinic hydrocarbons such as Isopar M are used as a solvent.

Further disclosed herein is a method for stabilizing cosmetic compositions, wherein [6]-paradol is added to the cosmetic compositions and wherein the cosmetic compositions are selected from the group consisting of cleansing compositions and fragrance compositions.

In a preferred embodiment according to the method of the invention [6]-paradol stabilizes odor/and or color of the cosmetic compositions. In another preferred embodiment according to the invention [6]-paradol protects cosmetic compositions from discoloration and/or odor deviations. Cosmetic composition in the sense of the present invention is to be understood as cleansing composition and/or fragrance composition.

In a preferred embodiment according to the method of the invention the cleansing composition is soap.

In one embodiment according to the method of the invention the fragrance composition is perfume or eau de toilette. In a preferred embodiment according to the invention the fragrance composition is eau de toilette.

In another embodiment according to the method of the invention [6]-paradol is used in an amount of 0.0001 to 1 wt. %, preferably in the range from 0.001 to 0.1 wt. %, and particularly preferably in the range from 0.005 to 0.05 wt. % relative to the total weight of the composition. The most preferred amount of [6]-paradol is 0.01 to 0.02 wt. % relative to the total weight of the composition. Another most preferred amount of [6]-paradol is 0.05 wt. % relative to the total weight of the composition.

In a preferred embodiment according to the method of the invention the cosmetic composition is free of BHT. In other words, in a preferred embodiment according to the method of the invention [6]-paradol is used alone for stabilization of cosmetic compositions. The term "alone" means in this context the use of [6]-paradol without BHT.

In one embodiment according to the method of the invention [6]-paradol is added as a mixture with a solvent to the cosmetic composition. Any solvent which is suitable for [6]-paradol can be used herein, for example oils such as vegetable oil triglycerides e.g. caprylic/capric triglyceride or vegetable oils (processed e.g. refined, hydrogenated or non-processed) such as e.g. soybean (*Glycine soja*) oil, sunflower (*Helianthus annuus*) seed oil, castor (*Ricinus communis*) seed oil, wheat (*Triticum vulgare*) germ oil, corn (*Zea mays*) oil, sweet almond (*Prunus Amygdalus Dulcis*) seed oil, sesame (*Sesamum indicum*) seed oil, olive (*Olea europaea*) oil, mineral oil (paraffinum liquidum), organic solvents (of synthetic or natural origin) such as e.g. dipropylene glycol, isopropyl myristate, isopropyl palmitate, ethyl myristate, methyl myristate, dioctyl adipate, triethyl citrate, triacetin, diethyl tartrate, ethyl lactate, butyl lactate, isoparaffinic hydrocarbons available e.g. as Isopar series like Isopar M, Isopar L, isopar H, isopar G, alcohols such as e.g. ethanol, isopropyl alcohol, benzyl alcohol, phenoxyethyl alcohol, propylene glycol, butylene glycol, 1,3-propandiol, hexylene glycol, 1,2-pentanediol, 1,2-hexanediol, 1,2-octanediol or mixtures of two or more of the mentioned solvents.

In a preferred embodiment according to the method of the invention Caprylic/Capric Triglyceride (CCTG) is used as a solvent. In a further preferred embodiment according to the invention soybean (*Glycine soja*) oil, sunflower (*Helianthus annuus*) seed oil or mineral oil is used as a solvent. In a further preferred embodiment a water and/or miscible solvent is used as a solvent, for example ethanol, isopropyl alcohol, triethyl citrate, propylene glycol, butylene glycol, 1,3-propandiol, 1,2-pentanediol, 1,2-hexanediol. In a further preferred embodiment according to the method of the invention dipropylene glycol (DPG) is used as a solvent. In a further preferred embodiment according to the method of the invention isopropyl myristate (IPM) or isopropyl palmitate (IPP) is used as a solvent. In a further preferred embodiment according to the method of the invention dioctyl adipate (DOA) is used as a solvent. In a further preferred embodiment according to the method of the invention isoparaffinic hydrocarbons such as Isopar M are used as a solvent.

Further disclosed herein is a soap comprising [6]-paradol. Any soap is covered covered herein, for example synthetic soaps which are made from petroleum-based products, heavy soaps which are made from lead, zinc, or other heavy-metal compounds, liquid soaps or solid soaps.

In one embodiment [6]-paradol is present in the soap in an amount of 0.0001 to 1 wt. %, preferably in the range from 0.001 to 0.1 wt. %, and particularly preferably in the range from 0.005 to 0.05 wt. % relative to the total weight of the soap. The most preferred amount of [6]-paradol is 0.01 to 0.02 wt. % relative to the total weight of the soap. Another most preferred amount of [6]-paradol is 0.005 wt. % relative to the total weight of the soap.

Further disclosed herein is an eau de toilette comprising [6]-paradol. In one embodiment [6]-paradol is present in the eau de toilette in an amount of 0.0001 to 1 wt. %, preferably in the range from 0.001 to 0.1 wt. %, and particularly preferably in the range from 0.005 to 0.05 wt. % relative to the total weight of the eau de toilette. The most preferred amount of [6]-paradol is 0.01 to 0.02 wt. %, relative to the total weight of the eau de toilette. Another most preferred amount of [6]-paradol is 0.05 wt. %, relative to the total weight of the eau de toilette.

Further disclosed herein is an air freshener comprising [6]-paradol. In one embodiment [6]-paradol is present in the air freshener in an amount of 0.0001 to 1 wt. %, preferably in the range from 0.001 to 0.1 wt. %, and particularly preferably in the range from 0.005 to 0.05 wt. % relative to the total weight of the air freshener. The most preferred amount of [6]-paradol is 0.01 to 0.02 wt. %, relative to the total weight of the air freshener. Another most preferred amount of [6]-paradol is 0.05 wt. %, relative to the total weight of the air freshener.

Further disclosed herein is a candle comprising [6]-paradol. In one embodiment [6]-paradol is present in the candle in an amount of 0.0001 to 1 wt. %, preferably in the range from 0.001 to 0.1 wt. %, and particularly preferably in the range from 0.005 to 0.05 wt. % relative to the total weight of the candle. The most preferred amount of [6]-paradol is 0.01 to 0.02 wt. %, relative to the total weight of the candle. Another most preferred amount of [6]-paradol is 0.05 wt. %, relative to the total weight of the candle.

The foregoing descriptions as well as the following description of exemplary embodiments do not represent a waiver of certain embodiments or features.

FIGURES

The invention will be explained in further detail with reference to specific embodiments as shown in the drawings, in which FIG. 1 shows results of Soap base 1 regarding oxidative rancidity (peroxide value)

EXAMPLES

Example 1: Stabilization of Fragrance Compositions

Figure 1:
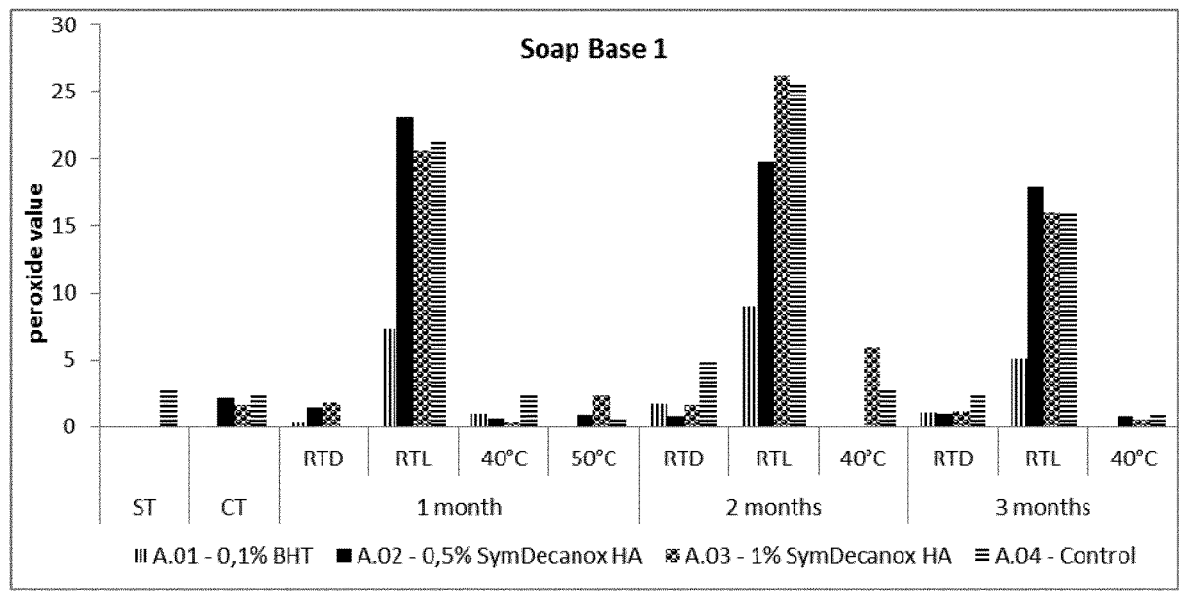

The study has been launched with two fragrances (namely FEROCE and ECLAT) to verify if [6]-paradol can be a replacement of BHT in fragrance compositions. The efficacy of [6]-paradol was compared to BHT, alone, on the protection of fragrance ECLAT and, in presence of EDTA, on the protection fragrance FEROCE.

Fragrance ECLAT is supposedly very sensitive to discoloration issues while Fragrance FEROCE is believed to be susceptible to color and odor deviations.

Odor Description of Fragrance FEROCE:
  TOP notes: Bergamot, Citrus
  HEART notes: Floral, Jasmin, *Gardenia*
  BASE notes: Wood, Cedarwood, Animal, Musk, Sandalwood Odor Description Fragrance ECLAT:
  TOP notes: Pepper, Leafy green, Mandarin
  HEART notes: Jasmin, Floral, Lily of the valley, Rosewood, Orris, Violet,
  BASE notes: Wood, Musk, Sandalwood, Balsam, Cedarwood, Animal 6-paradol was previously solubilized in the solvent, either ethanol or DPG at a concentration of 10% ("blend"). The "blend" was then added to the fragrance formulation to achieve a final concentration of 6-paradol in formulation of 0.01% or 0.05%. BHT was presolubilised in ethanol at a concentration of 10% and subsequently added in formulation to reach a final concentration of 0.05%.

TABLE 1

Fragrance ECLAT

| Additives/Trial | 1 (control) | 2 (BHT in ethanol) | 3 (6-paradol in DPG) | 4 (6-paradol in DPG) | 5 (6-paradol in ethnaol) |
|---|---|---|---|---|---|
| Solvent | Ethanol | Ethanol | DPG | DPG | Ethanol |
| Blend (%) | — | 0.5% | 0.1% | 0.5% | 0.5% |
| [6]-paradol (%) | — | — | 0.01 | 0.05 | 0.05 |
| BHT (%) | — | 0.05 | — | — | — |

TABLE 2

Fragrance FEROCE

| Additives/Trial | 1 (control) | 2 (BHT in ethanol) | 3 (6-paradol in DPG) | 4 (6-paradol in DPG) | 5 (6-paradol in ethnaol) |
|---|---|---|---|---|---|
| Solvent | Ethanol | Ethanol | DPG | DPG | Ethanol |
| Blend (%) | — | 0.5% | 0.1% | 0.5% | 0.5% |
| [6]-paradol (%) | — | — | 0.01 | 0.05 | 0.05 |
| BHT (%) | — | 0.05 | — | — | — |
| EDTA (%) | — | 0.001 | 0.001 | 0.001 | 0.001 |

Visual and Olfactory Evaluations

All samples of EDT are put in different conditions—RT Dark, RT Light, 5° C. ("fresh"), 40° C. during three months and 50° C. during one month —, and are evaluated each month. A Sun test (equipped with a Xenon lamp (1500 W) is also run for 16 hours. A visual assessment of the color is made each month for all conditions. The olfactory evaluation was performed for samples stored at 50° C. and at 40° C. and after Sun test.

TABLE 3

Evaluation scales

| ΔI Fragrance impact variation | ΔN Fragrance hedonic profile | ΔC Fragrance color variation |
|---|---|---|
| 5 = No change | 5 = No change | 5 = No change |
| 4 = Slight change | 4 = Slight change | 4 = Slight change |
| 3 = Noticeable change | 3 = Noticeable change | 3 = Noticeable change |
| 2 = Significant change | 2 = Significant change | 2 = Significant change |
| 1 = Extreme change | 1 = Extreme change - | 1 = Extreme change |
| | | + = darker |
| | | − = lighter |

TABLE 4

Results fragrance ECLAT
The fragrance impact was not altered in the control samples (without antioxidant) in all conditions tested. The addition of antioxidant (6-paradol or BHT) showed no effect on the protection of the fragrance impact.

|  | Stability ΔN | Color ΔC |
|---|---|---|
| Without antioxidant | | |
| 5° C. (3 months) | — | 5 |
| Sun test (16 h) | 3 | 3+ |
| 50° C. (1 month) | 2 | 2+ |
| 40° C. (3 months) | 3 | 2+ |
| RT Light (3 months) | — | 4+ |
| 0.05% BHT (in ethanol) | | |
| 5° C. (3 months) | — | 5 |
| Sun test (16 h) | 4− | 4+ |
| 50° C. (1 month) | 3 | 2+ |
| 40° C. (3 months) | 4 | 2+ |
| RT Light (3 months) | — | 5+ |
| 0.05% 6-paradol (in ethanol) | | |
| 5° C. (3 months) | — | 5 |
| Sun test (16 h) | 4 | 3+ |
| 50° C. (1 month) | 4 | 2+ |
| 40° C. (3 months) | 4 | 2+ |
| RT Light (3 months) | — | 4− |
| 0.05% 6-paradol (in DPG) | | |
| 5° C. (3 months) | — | 5 |
| Sun test (16 h) | 4 | 3+ |
| 50° C. (1 month) | 4 | 2+ |
| 40° C. (3 months) | 4 | 2+ |
| RT Light (3 months) | — | 4− |
| 0.01% 6-paradol (in DPG) | | |
| 5° C. (3 months) | — | 5 |
| Sun test (16 h) | 4+ | 3+ |
| 50° C. (1 month) | 4 | 2+ |
| 40° C. (3 months) | 4 | 2+ |
| RT Light (3 months) | — | 4− |

All additives increase the fragrance stability compared to control.

After 1 month at 50° C.: all concentrations of 6-paradol improve the fragrance stability compared to BHT and control (BHT improves it compared to control but less than 6-paradol).

After 3 months at 40° C.: All additives increase the fragrance stability compared to control.

TABLE 5

Results fragrance FEROCE
The fragrance impact was slighly altered in the control samples (without antioxidant) in all conditions tested. The addition of antioxidant (6-paradol or BHT) showed no effect on the protection of the fragrance impact.

|  | Stability ΔN | Color ΔC |
|---|---|---|
| Without additive | | |
| 5° C. (3 months) | — | 5 |
| Sun test (16 h) | 3 | 5+ |
| 50° C. (1 month) | 3 | 3+ |
| 40° C. (3 months) | 4− | 1+ |
| RT Light (3 months) | — | 3− |
| 0.05% BHT (in ethanol) + 0.001% EDTA | | |
| 5° C. (3 months) | — | 4− |
| Sun test (16 h) | 4 | 5+ |
| 50° C. (1 month) | 4 | 5 |
| 40° C. (3 months) | 4 | 5+ |
| RT Light (3 months) | — | 4− |
| 0.05% [6]-paradol (in ethanol) + 0.001% EDTA | | |
| 5° C. (3 months) | — | 4− |
| Sun test (16 h) | 3 | 5+ |
| 50° C. (1 month) | 4 | 5+ |
| 40° C. (3 months) | 4+ | 4+ |
| RT Light (3 months) | — | 3− |
| 0.05% [6]-paradol (in DPG) + 0.001% EDTA | | |
| 5° C. (3 months) | — | 5 |
| Sun test (16 h) | 3 | 5+ |
| 50° C. (1 month) | 4 | 5+ |
| 40° C. (3 months) | 4 | 4+ |
| RT Light (3 months) | — | 3− |
| 0.01% [6]-paradol (in DPG) + 0.001% EDTA | | |
| 5° C. (3 months) | — | 4− |
| Sun test (16 h) | 3+ | 5 |
| 50° C. (1 month) | 4 | 5+ |
| 40° C. (3 months) | 4+ | 4+ |
| RT Light (3 months) | — | 3− |

After 1 month at 50° C.: increase of fragrance and color stabilities with all additives compared to control.

After 3 months at 5° C.: better color stability with 0.05% 6-paradol (blend in DPG), others additives are worse than control.

After 3 months at 40° C.: all additives protect the color of the fragrance, which is very altered for control.

TABLE 6

Conclusion: Protection of odor - ECLAT

| Conditions |  | 0.05% BHT (in ethanol) | 0.05% 6-paradol (in ethanol) | 0.05% 6-paradol (in DPG) | 0.01% 6-paradol (in DPG) |
|---|---|---|---|---|---|
| suntest (16 h) | Stability ΔN | + | ++ | ++ | +++ |
| 40° C. | Stability ΔN | + | + | + | + |
| 50° C. | Stability ΔN | + | ++ | ++ | ++ |

=: similar to control
+: better than control
−: worse than control

[6]-paradol helps to stabilize the fragrance compared to control and gives in most conditions better results than BHT. A concentration of 0.01% of [6]-paradol in DPG seems to provide a better stability than other concentration at light. No improvement of the fragrance impact was observed with both antioxidants tested, [6]-paradol or BHT.

TABLE 7

Conclusion: Protection of color - FEROCE

| Conditions | 0.05% BHT | 0.05% 6-paradol (in ethanol) | 0.05% 6-paradol (in DPG) | 0.01% 6-paradol (in DPG) |
|---|---|---|---|---|
| 5° C. | − | − | = | − |
| Suntest (16 h) | = | = | = | + |
| 40° C. | ++ | + | + | + |
| 50° C. | ++ | + | + | + |

=: similar to control
+: better than control
−: worse than control

[6]-paradol helps to protect the fragrance color at high temperatures (40° C. and 50° C.), like BHT. 0.01% of [6]-paradol in DPG is the only additive that stabilizes the fragrance color after the Sun test. [6]-paradol had no effect to protect the EDT from light induced discoloration.

Example 2: Stabilization of Cleansing Compositions

Two studies have been launched to verify if [6]-paradol could be a replacement of BHT in bar soaps. We compared the efficacy of [6]-paradol and BHT on the oxidative rancidity, on the protection of the color, and on the protection of the fragrance and its discoloration.

Soap base 1 contains 80% of fats (including 1% of free fatty acids) and has a high moisture content (12%). It is known to be highly sensitivity to oxidative rancidity.

Soap base 2 contains 96% of fats (no free fatty acids) and has low moisture content (2%). It has shown low sensitivity to oxidative rancidity.

TABLE 8

Study of the oxidative rancidity

| Material name | EU INCI | A.01 | A.02 | A.03 | A.04 | D.01 | D.02 | D.03 | D.04 |
|---|---|---|---|---|---|---|---|---|---|
| Soap base 1 | | 99.9 | 99.5 | 99.0 | 100.0 | — | — | — | — |
| Soap base 2 | SODIUM TALLOWATE SODIUM COCOATE SODIUM PALM KERNELATE AQUA TITANIUM DIOXIDE | — | — | — | — | 99.9 | 99.5 | 99.0 | 100.0 |
| BHT | BUTYL HYDROXYTOLUENE | 0.1 | — | — | — | 0.1 | — | — | — |
| SymDecanox HA | CAPRYLIC/CAPRIC TRIGLYCERIDE, HYDROXYMETHOXYPHENYL DECANONE | — | 0.5 | 1.0 | — | — | 0.5 | 1.0 | — |
| | Total (%) | 100.0 | 100.0 | 100.0 | 100.0 | 100.0 | 100.0 | 100.0 | 100.0 |

TABLE 9

Study of the protection of color

| Material name | EU INCI | B.01 | B.02 | B.03 | B.04 | E.01 | E.02 | E.03 | E.04 |
|---|---|---|---|---|---|---|---|---|---|
| Soap base 1 | | 99.6 | 99.2 | 98.7 | 99.7 | — | — | — | — |
| Soap base 2 | SODIUM TALLOWATE SODIUM COCOATE SODIUM PALM KERNELATE AQUA TITANIUM DIOXIDE | — | — | — | — | 99.6 | 99.2 | 98.7 | 99.7 |
| Blue colorant FD&C Blue 1 0.1% sol. | AQUA C.I. 42090 | 0.3 | 0.3 | 0.3 | 0.3 | 0.3 | 0.3 | 0.3 | 0.3 |
| BHT | BUTYL HYDROXYTOLUÉNE | 0.1 | — | — | — | 0.1 | — | — | — |
| SymDecanox HA | CAPRYLIC/CAPRIC TRIGLYCERIDE, HYDROXYMETHOXYPHENYL DECANONE | — | 0.5 | 1.0 | — | — | 0.5 | 1.0 | — |
| | Total (%) | 100.0 | 100.0 | 100.0 | 100.0 | 100.0 | 100.0 | 100.0 | 100.0 |

All samples of soaps are put in different conditions: 5° C. (used to as a control), RT Dark, RT Light, 40° C. during three months and at 50° C. during one month, and are evaluated each month. A crash test (CT, 5 cycles 50° C./room temperature/−20° C.) and a sun test (ST) are also run. An Oxipress test is launched for all soaps. Oxipresss determines the oxidative resistance of oil and fat in all kinds of raw materials, semi-finished and finished products, such as food, animal feed, cosmetics and biodiesel. With Oxipresss it is possible to examine heterogeneous products. Therefore, it is not necessary to extract the fat and oil from the products prior to analysis. The sample can be placed in the reaction vessel without any preparation.

SymDecanox HA has a concentration of [6]-paradol of 1 wt.-%.

For the study of the oxidative rancidity a quantitative evaluation of the rancidity is made: the measure of the peroxide value. The peroxide value is a marker of the oxidative primary products. A colorimetric measurement of samples is also made each month.

For the study of the protection of color a colorimetric measurement of the samples is made each month. The equations for the colorimetric measurement results are as follows:

$$\Delta E^*_{ab\ vs\ t=0} = \sqrt{(L^*_x - L^*_{t=0})^2 + (a^*_x - a^*_{t=0})^2 + (b^*_x - b^*_{t=0})^2}$$

$$\Delta E^*_{vs\ control} = \sqrt{(L^*_x - L^*_{control})^2 + (a^*_x - a^*_{control})^2 + b^*_x + (b^*_x - b^*_{control})^2}$$

Results of the Study of Oxidative Rancidity

Peroxide Value

Figure 2:
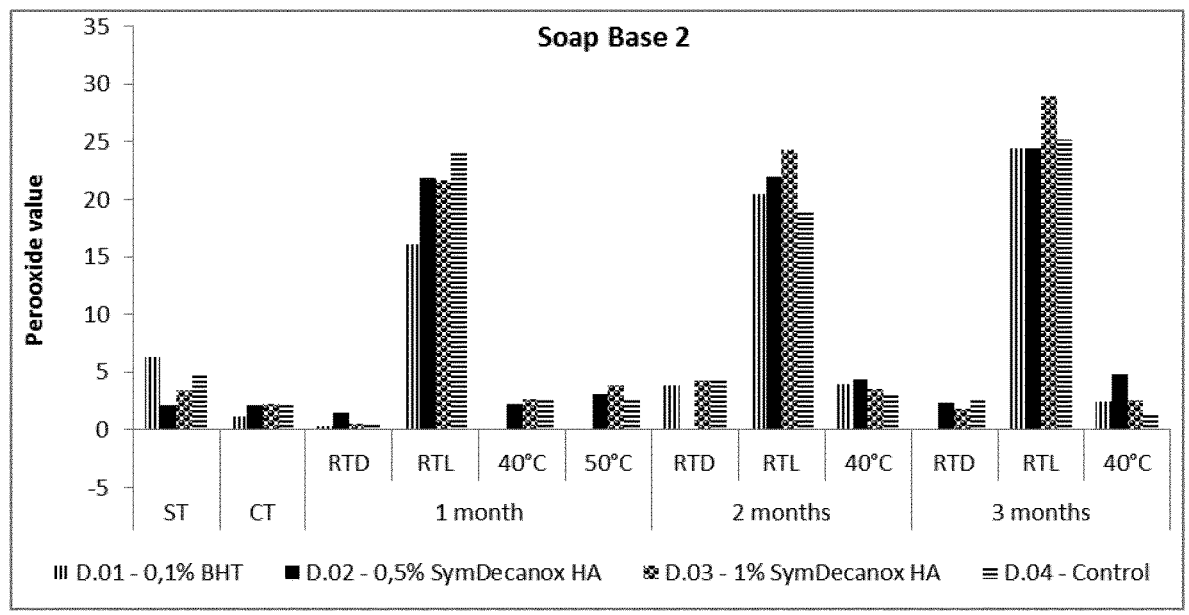
FIG. 2 shows results of Soap base 2 regarding oxidative rancidity (peroxide value)
Figure 3:
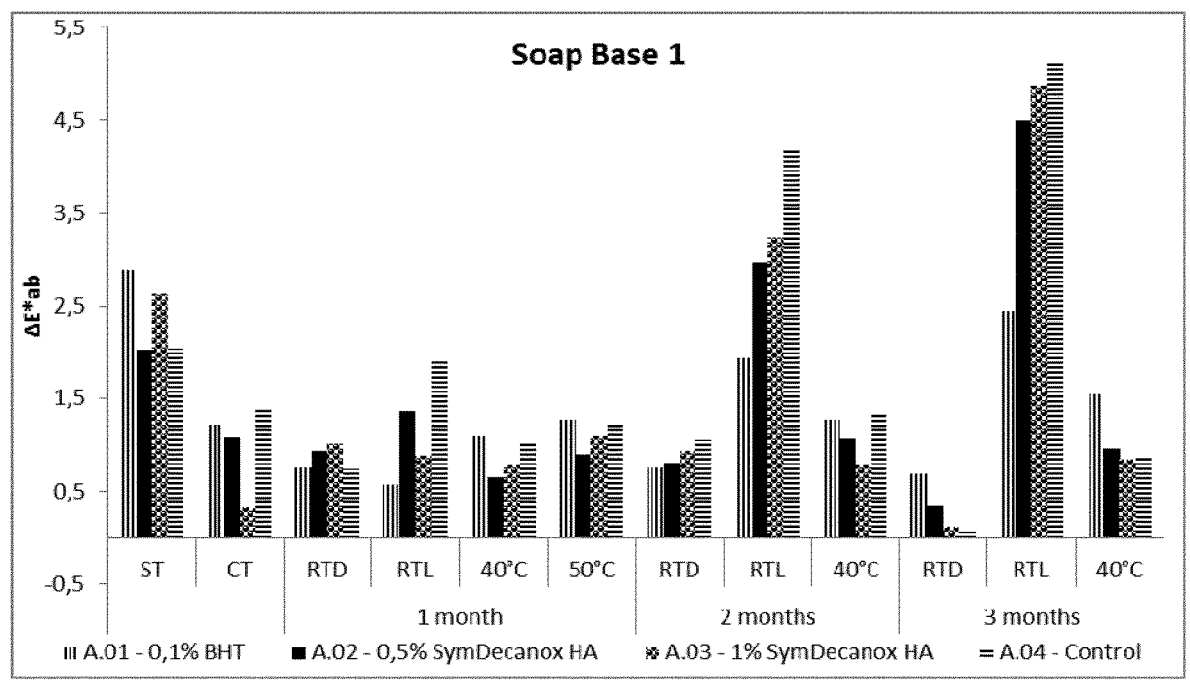
FIG. 3 shows results of Soap base 1 regarding oxidative rancidity (colorimetric measurement)

FIGS. 1 and 2 show the results of Singapore and Soap base 2. It can be seen from Soap base 1 that 0.5% SymDecanox HA achieves good results after 2 months at light. FIG. 3 shows the results of the colorimetric measurement of Soap base 1. These results clearly show that SymDecanox HA has a positive impact at light and a better protection at high temperatures, whereas BHT causes more discoloration versus control. Regarding the crash test, 1% SymDecanox HA prevents the soap from discoloration. After sun test, it can be seen that both BHT and 1% SymDecanox HA have a negative impact and increase the discoloration versus control.

Figure 4:
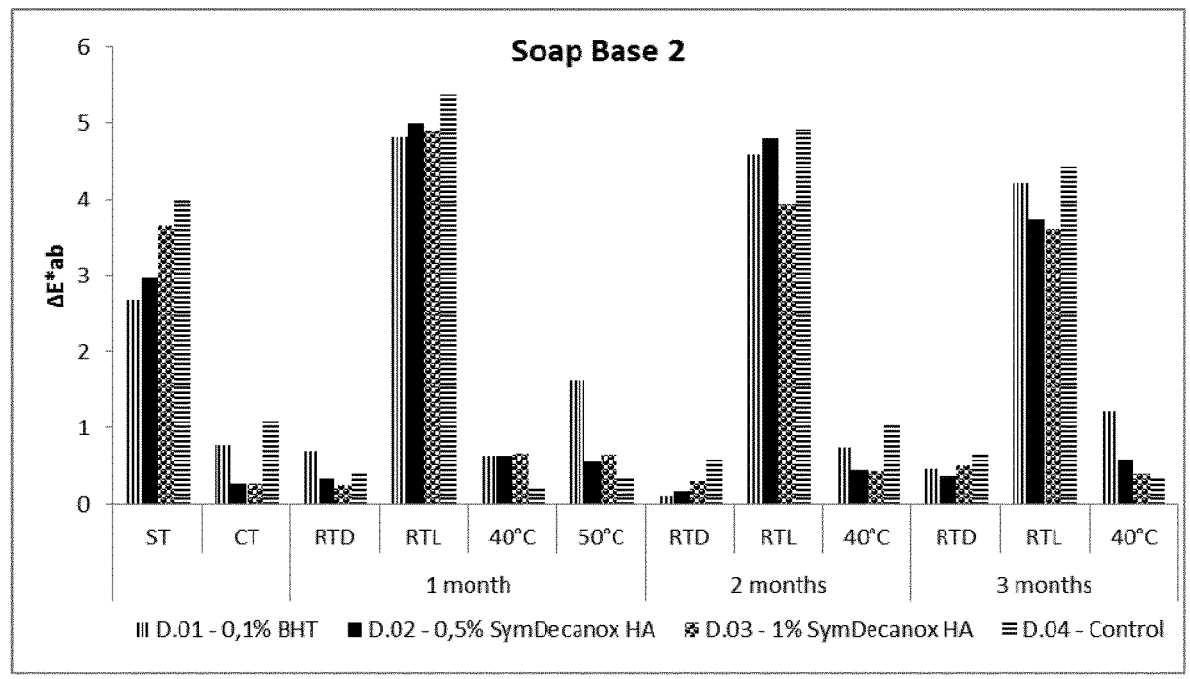
FIG. 4 shows results of Soap base 2 regarding oxidative rancidity (colorimetric measurement)

FIG. 4 shows the results of the colorimetric measurement of Soap base 2. As one can see, 1% SymDecanox HA is the more efficient antioxidant to prevent the discoloration both at light, at high temperatures as well after the crash test.

For the Oxipress test, soaps with 0.1% BHT vs soaps with 0.5% SymDecanox and soaps with 1% SymDecanox HA vs control soaps were launched.

TABLE 10

Soap base 1

| | Pressure (bar) | | |
|---|---|---|---|
| | $P_{1h}$ | $P_{72h}$ | $P_{72h} - P_{1h}$ |
| A.01 - 0.1% BHT | 6.26 | 6.22 | −0.04 |
| A.02 - 0.5% SymDecanox HA | 6.30 | 6.03 | −0.27 |
| A.03 - 1% SymDecanox HA | 6.04 | 6.08 | 0.04 |
| A.04 - Control | 6.09 | 5.84 | −0.25 |

TABLE 11

Soap base 2

| | Pressure (bar) | | |
|---|---|---|---|
| | $P_{1h}$ | $P_{48h}$ | $P_{48h} - P_{1h}$ |
| D.01 - 0.1% BHT | 6.15 | 6.2 | 0 |
| D.02 - 0.5% SymDecanox HA | 6.19 | 6 | −0.2 |
| D.03 - 1% SymDecanox HA | 6.07 | 6.26 | 0.04 |
| D.04 - Control | 6.1 | 6.18 | −0.18 |

Figure 5:
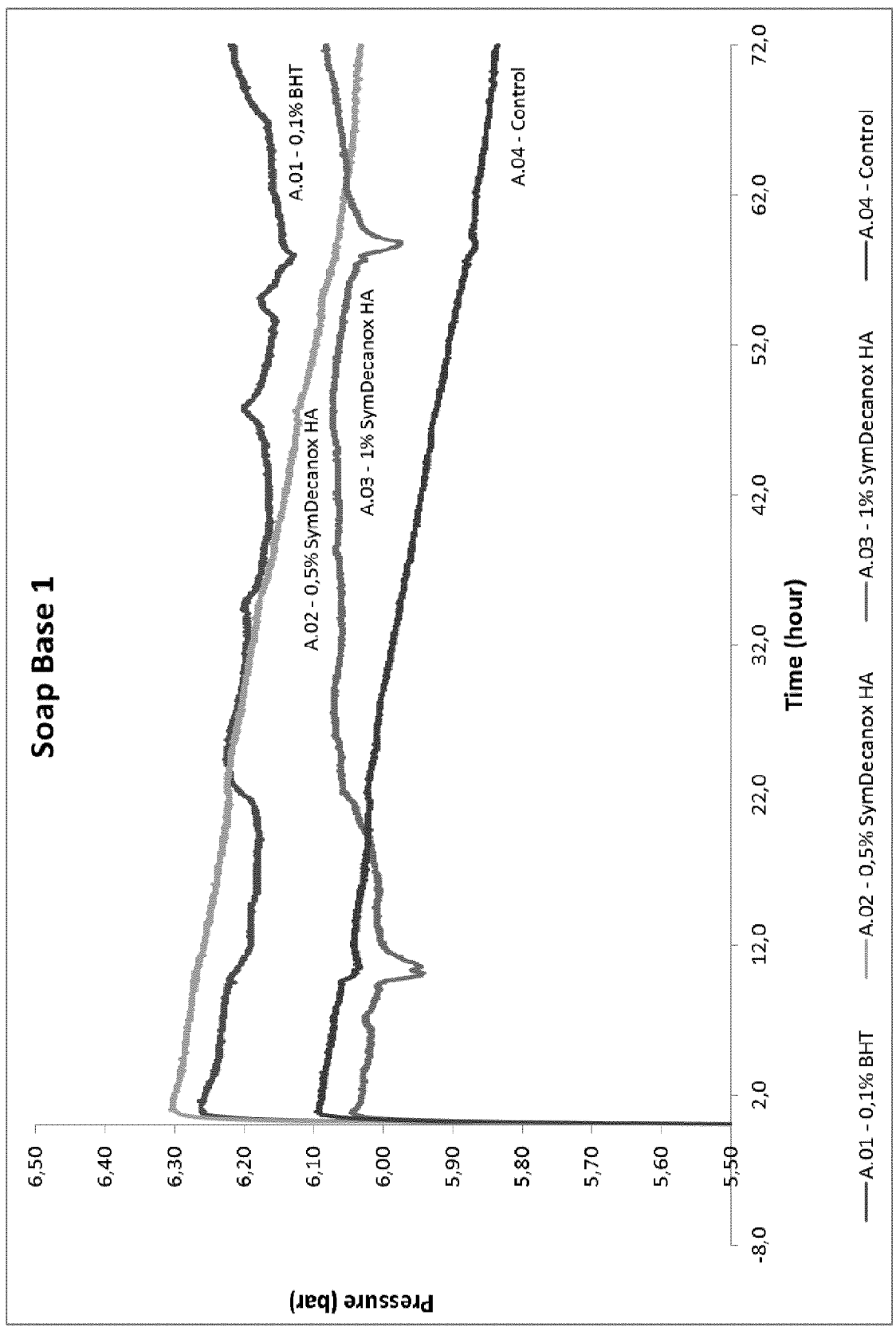
FIG. 5 shows results of Soap base 1 regarding oxidative rancidity (oxipress test)
Figure 6:
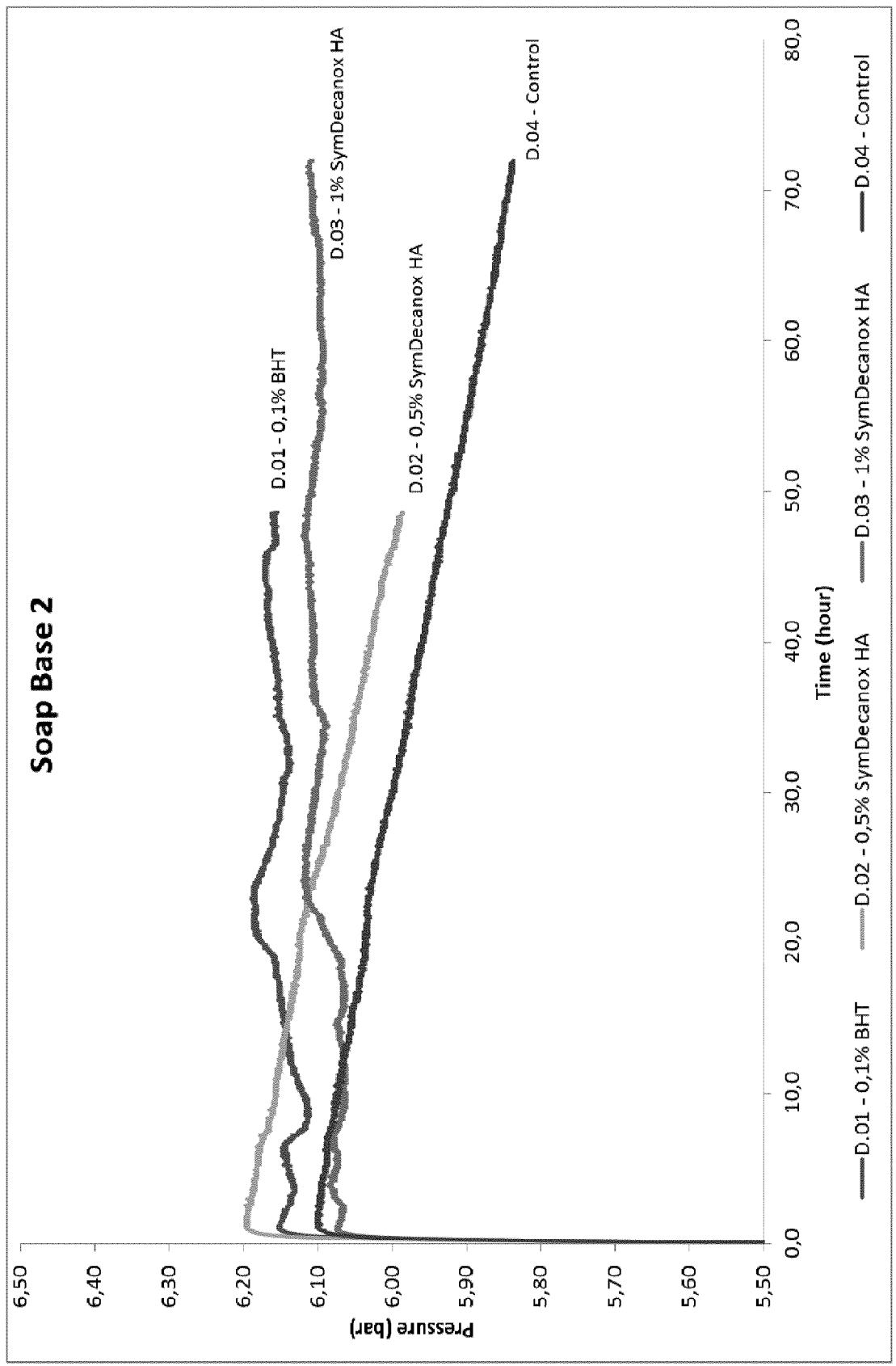
FIG. 6 shows results of Soap base 2 regarding oxidative rancidity (oxipress test)

For both soap bases, the oxygen consumption is more important for soaps with 0.5% SymDecanox HA and control soaps in comparison with soaps with 0.1% BHT and 1% SymDecanox HA. That shows that both 0.1% BHT and 1% SymDecanox HA protects the soap from oxidation. FIG. 5 shows the results for Soap base 1; FIG. 6 shows the results for Soap base 2.

Results of the Study of the Protection of Color

Figure 7:
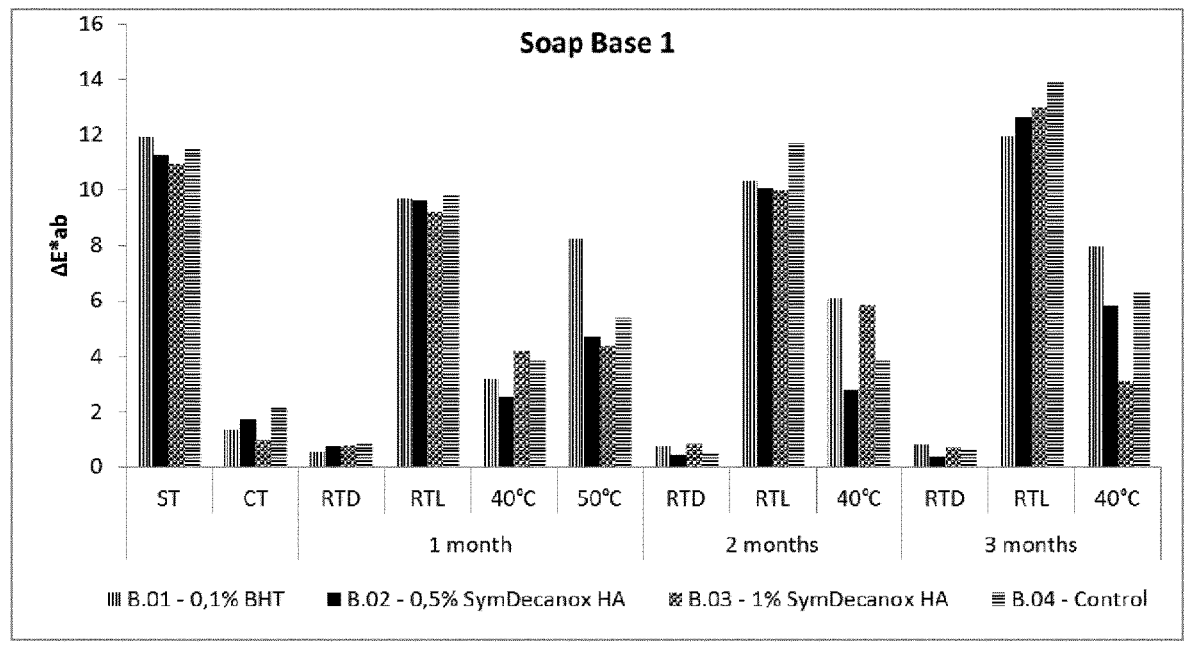
FIG. 7 shows results of Soap base 1 regarding color protection (colorimetric measurement)
Figure 8:
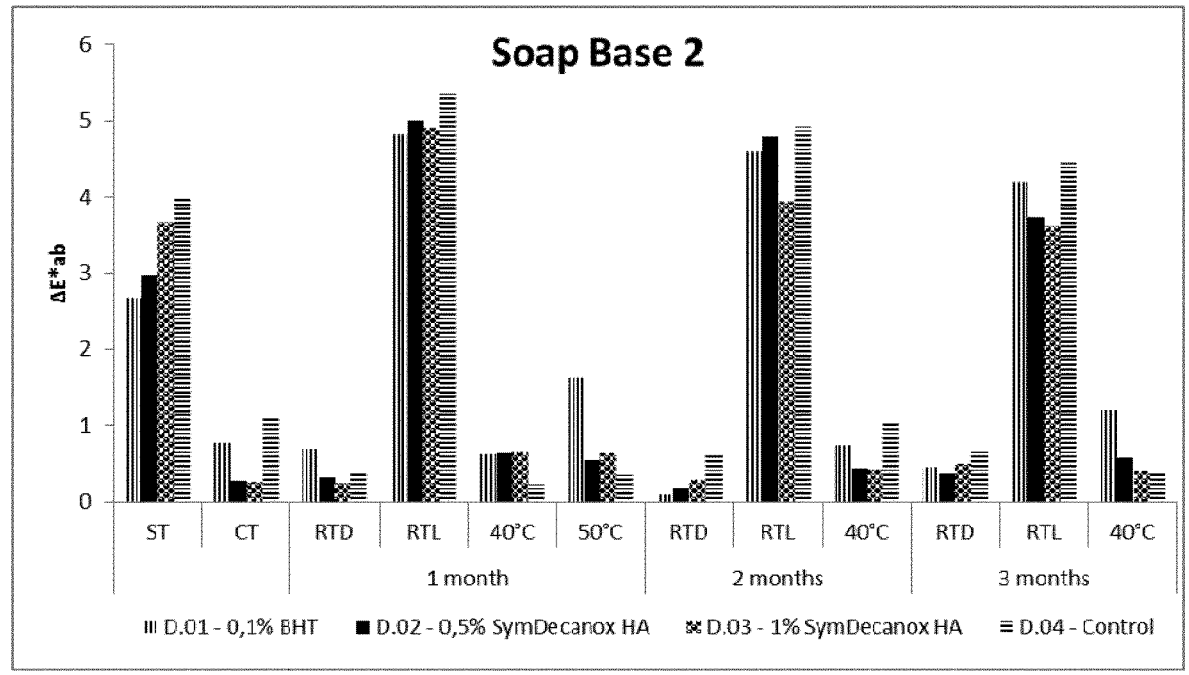
FIG. 8 shows results of Soap base 2 regarding color protection (colorimetric measurement)

FIG. 7 shows the result for Soap base 1; FIG. 8 shows the results of Soap base 2.

It can be seen from FIG. 7 that BHT has a negative impact on discoloration versus control after 3 months at 40° C. After one month at 50° C., BHT leads to a strong discoloration to the soap. Furthermore the addition of 1% SymDecanox HA clearly protects the soap from discoloration after 3 months at 40° C. 0.5% SymDecanox HA also has a positive impact, whereas BHT leads to more discoloration than the control soap.

It can be seen from FIG. 8 that SymDecanox HA prevents the discoloration of the soap at high temperature and that this effect is dose-dependent. It has a better efficacy than BHT and control. At high temperatures, BHT does not protect the soap and gives same results than control. Both BHT and SymDecanox HA have a small impact versus control at light.

For the Oxipress test, soaps with 0.1% BHT vs soaps with 0.5% SymDecanox and soaps with 1% SymDecanox HA vs control soaps were launched.

TABLE 12

Soap base 1

| | Pressure (bar) | | |
|---|---|---|---|
| | $P_{1h}$ | $P_{72h}$ | $P_{72h} - P_{1h}$ |
| B.01 - 0.1% BHT | 6.19 | 6.2 | 0.01 |
| B.02 - 0.5% SymDecanox HA | 6.23 | 6 | −0.23 |
| B.03 - 1% SymDecanox HA | 6.28 | 6.26 | −0.02 |
| B.04 - Control | 6.31 | 6.18 | −0.13 |

TABLE 13

Soap base 2

| | Pressure (bar) | | |
|---|---|---|---|
| | $P_{1h}$ | $P_{25h}$ | $P_{25h} - P_{1h}$ |
| E.01 - 0.1% BHT | 6.27 | 6.25 | −0.02 |
| E.02 - 0.5% SymDecanox HA | 6.24 | 6.12 | −0.12 |
| E.03 - 1% SymDecanox HA | 6.21 | 6.2 | −0.01 |
| E.04 - Control | 6.3 | 6.22 | −0.08 |

Figure 9:
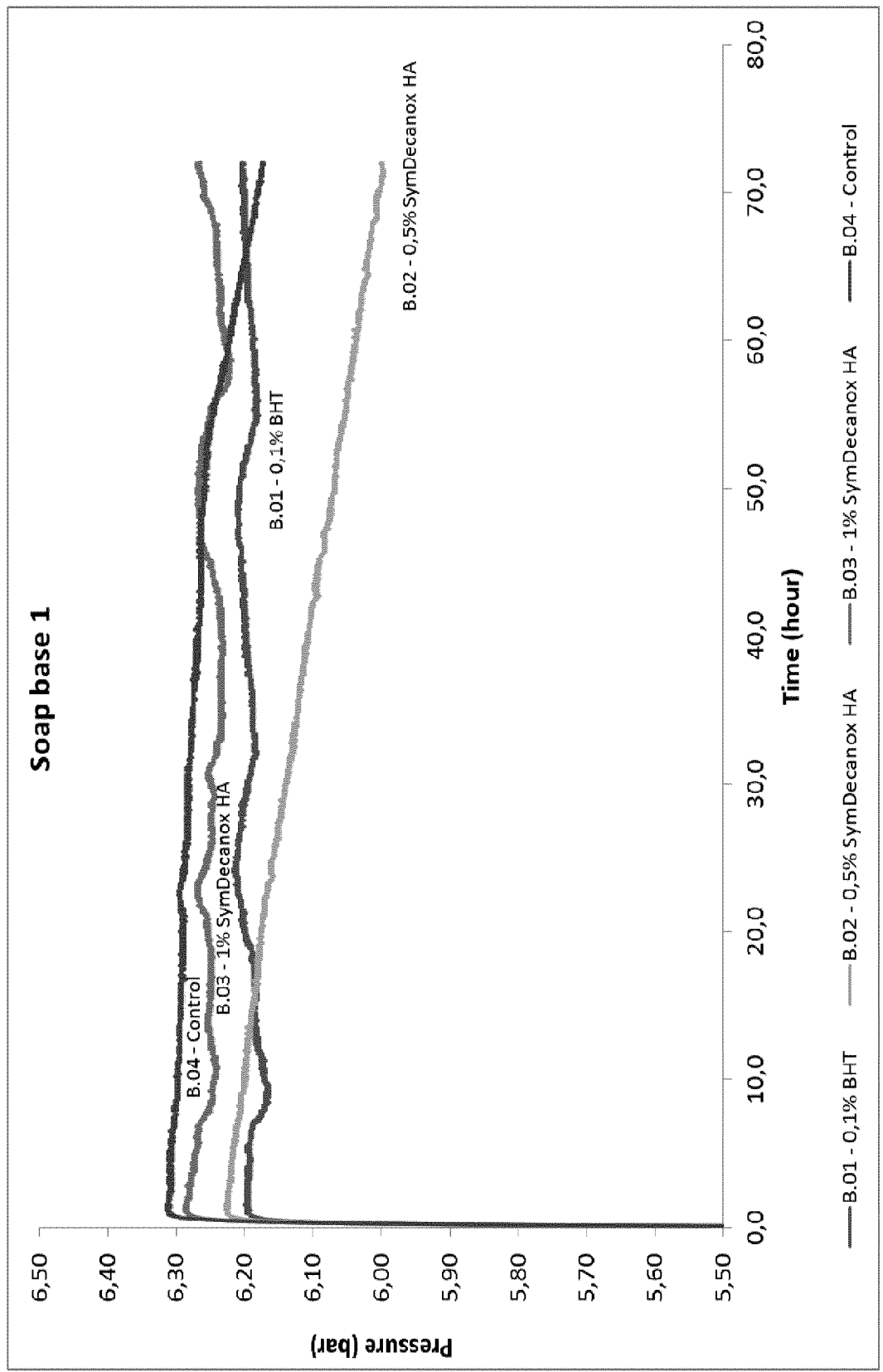
FIG. 9 shows results of Soap base 1 regarding color protection (oxipress test)
Figure 10:
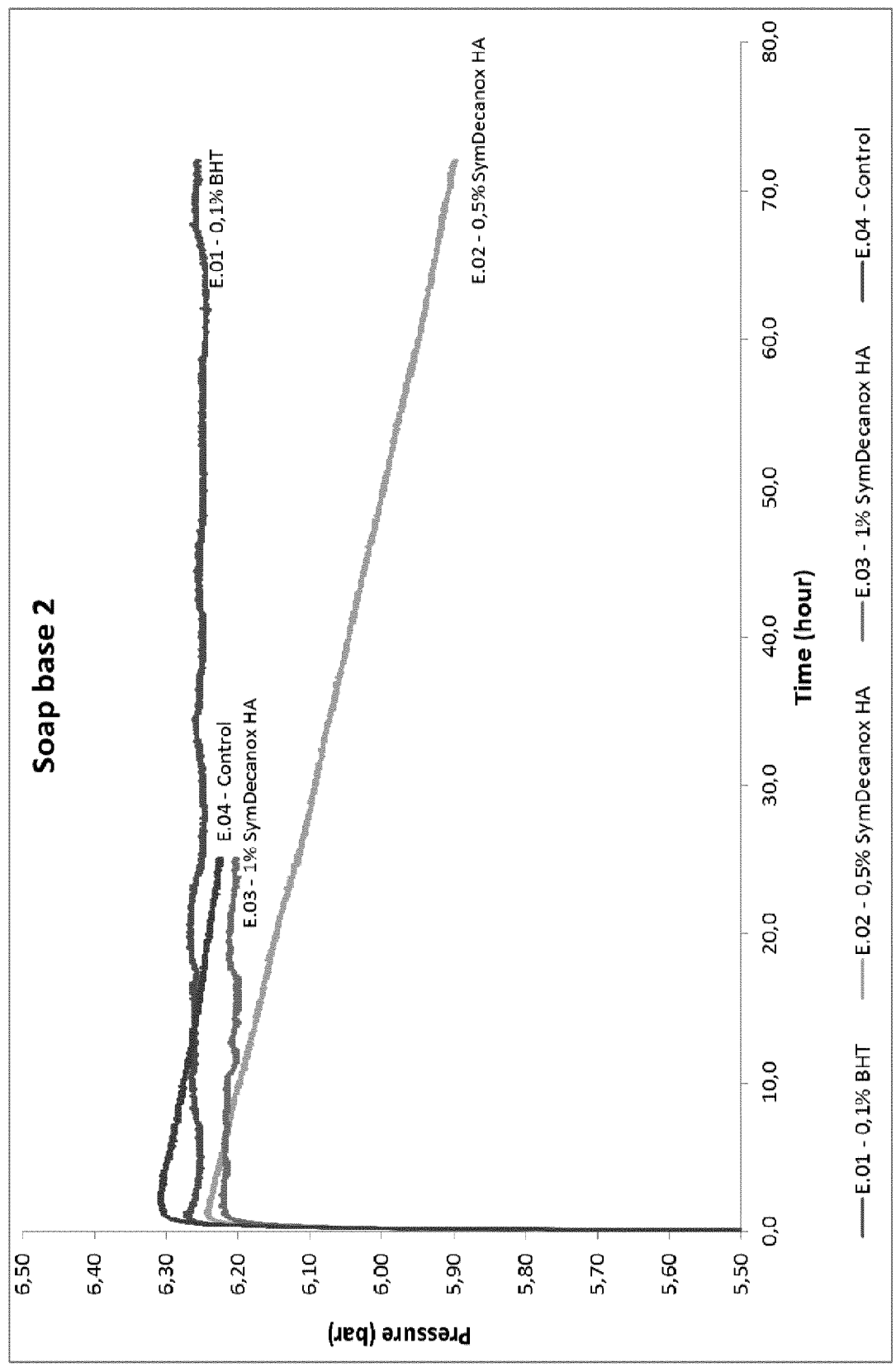
FIG. 10 shows results of Soap base 2 regarding color protection (oxipress test)

FIG. 9 shows the results for Soap base 1; FIG. 10 shows the results for Soap base 2.

TABLE 14

Conclusion: Protection of of soaps from oxidation and discoloration

| Type of soap | Soap name | Test (duration) | Conditions | 0.1% BHT | 0.5% SymDecanox | 1% SymDecanox |
|---|---|---|---|---|---|---|
| Uncolored unperfumed soaps | Soap base 1 | Color L.a.b (3 months) | RT Light | ++ | + | + |
| | | | 40-50° C. | − | = | = |
| | | Oxipresss (72 h) | RT Dark | ++ | = | ++ |
| | Soap base 2 | Color L.a.b (3 months) | Light | = | + | + |
| | | | 40-50° C. | − | = | = |
| | | Oxipresss (72 h) | RT Dark | ++ | = | ++ |
| Colored unperfumed soaps | Soap base 1 | Color L.a.b (3 months) | RT Light | ++ | + | = |
| | | | 40-50° C. | − | + | ++ |
| | | Oxipresss (72 h) | RT Dark | ++ | = | ++ |
| | Soap base 2 | Color L.a.b (3 months) | Light | + | + | + |
| | | | 40-50° C. | = | + | ++ |
| | | Oxipresss (72 h) | RT Dark | ++ | = | ++ |

+: better than control
=: similar to control
−: worse than control

The invention claimed is:

1. A method for stabilizing odour or colour of a fragrance composition, the method comprising
   (i) providing a fragrance composition comprising at least one aroma and/or flavouring compound selected from the groups consisting of:
     (a) fruit flavours selected from Eucalyptus, lemon, orange, banana, grape, lime, apricot and grapefruit oils;
     (b) fruit essences selected from apple, strawberry, cherry, orange, and pineapple;
     (c) bean and nut derived flavors selected from coffee, cocoa, cola, peanut, and almond;
     (d) root derived flavors selected from licorice or ginger;
     (e) essential and extracts selected from basil oil, bergamot oil, bitter almond oil, camphor oil, citronella oil, lemon oil; Eucalyptus citriodora oil, Eucalyptus oil, fennel oil, grapefruit oil, camomile oil, spearmint oil, caraway oil, lime oil, mandarin oil, nutmeg oil, myrrh oil, clove oil, clove blossom oil, orange oil, oregano oil, parsley or parsley seed oil, peppermint oil, rosemary oil, sage oil, star aniseed oil, thyme oil, vanilla extract, juniper oil, wintergreen oil, cinnamon leaf oil; cinnamon bark oil;
     (f) flavoring compounds selected from menthol, anethole, anisole, anisaldehyde, anisyl alcohol, (racemic) neomenthol, eucalyptol, menthone, isomenthone, isopulegol, menthyl acetate, menthyl propionate, carvone, methyl salicylate, eugenol acetate, isoeugenol methyl ether, beta-homocyclocitral, eugenol, isobutyraldehyde, 3-octanol, dimethyl sulfide, hexanol, hexanal, trans-2-hexenal, cis-3-hexenol, 4-terpineol, piperitone, linalool, 8-ocimenyl acetate, isoamyl alcohol, isovaleraldehyde, alpha-pinene, beta-pinene, limonene, piperitone, trans-sabinene hydrate, menthofuran, caryophyllene, germacrene D, cinnamaldehyde, mint lactone, thymol, gamma-octalactone, gamma-nonalactone, gamma-decalactone, (1,3E,5Z)-undecatriene, 2-butanone, ethyl formate, 3-octyl acetate, isoamyl isovalerate, cis- and trans-carvyl acetate, p-cymol, damascenone, damascone, cis-rose oxide, trans-rose oxide, fenchol, acetaldehyde diethyl acetal, 1-ethoxyethyl acetate, cis-4-heptenal, cis-jasmone, methyl dihydrojasmonate, 2'-hydroxypropiophenone, menthyl methyl ether, myrtenyl acetate, 2-phenylethyl alcohol, 2-phenylethyl isobutyrate, 2-phenylethyl isovalerate, geraniol, nerol and viridiflorol; and
   (ii) adding 0.005 to 0.05 wt. % relative to the total weight of the fragrance composition of [6]-paradol.

2. The method according to claim 1, wherein the fragrance composition is free of butylated hydroxytoluene.

3. The method according to claim 1, wherein [6]-paradol is added as a mixture with a solvent to the fragrance composition.

4. The method according to claim 3, wherein the solvent is selected from the group consisting of a water soluble solvent, miscible solvent, and combinations thereof.

5. The method according to claim 3, wherein the solvent is selected from the group consisting of Caprylic/Capric Triglyceride, dipropylene glycol, and combinations thereof.

6. The method according to claim 1, wherein said at least one aroma and/or flavoring compound is selected from the group consisting of menthol, cineol, eugenol, thymol, cinnamic aldehyde, peppermint oil, spearmint oil, Eucalyptus oil, thyme oil, cinnamon oil, clove oil, spruce needle oil, fennel oil, sage oil, aniseed oil, star anise oil, chamomile oil, and caraway oil, and their mixtures.

7. The method of claim 1, wherein the fragrance composition comprises 2 or more, 3 or more, 4 or more, five or more, six or more seven or more or eight or more aroma and/or flavoring compounds.

8. A soap comprising [6]-paradol, wherein [6]-paradol is present in the soap in an amount of from 0.005 to 0.05 wt. % based on the total weight of the soap.

9. An Eau de toilette comprising [6]-paradol, wherein [6]-paradol is present in the Eau de Toilette in an amount of from 0.005 to 0.05 wt. % based on the total weight of the Eau de toilette.

* * * * *